United States Patent Office 2,902,071
Patented Sept. 1, 1959

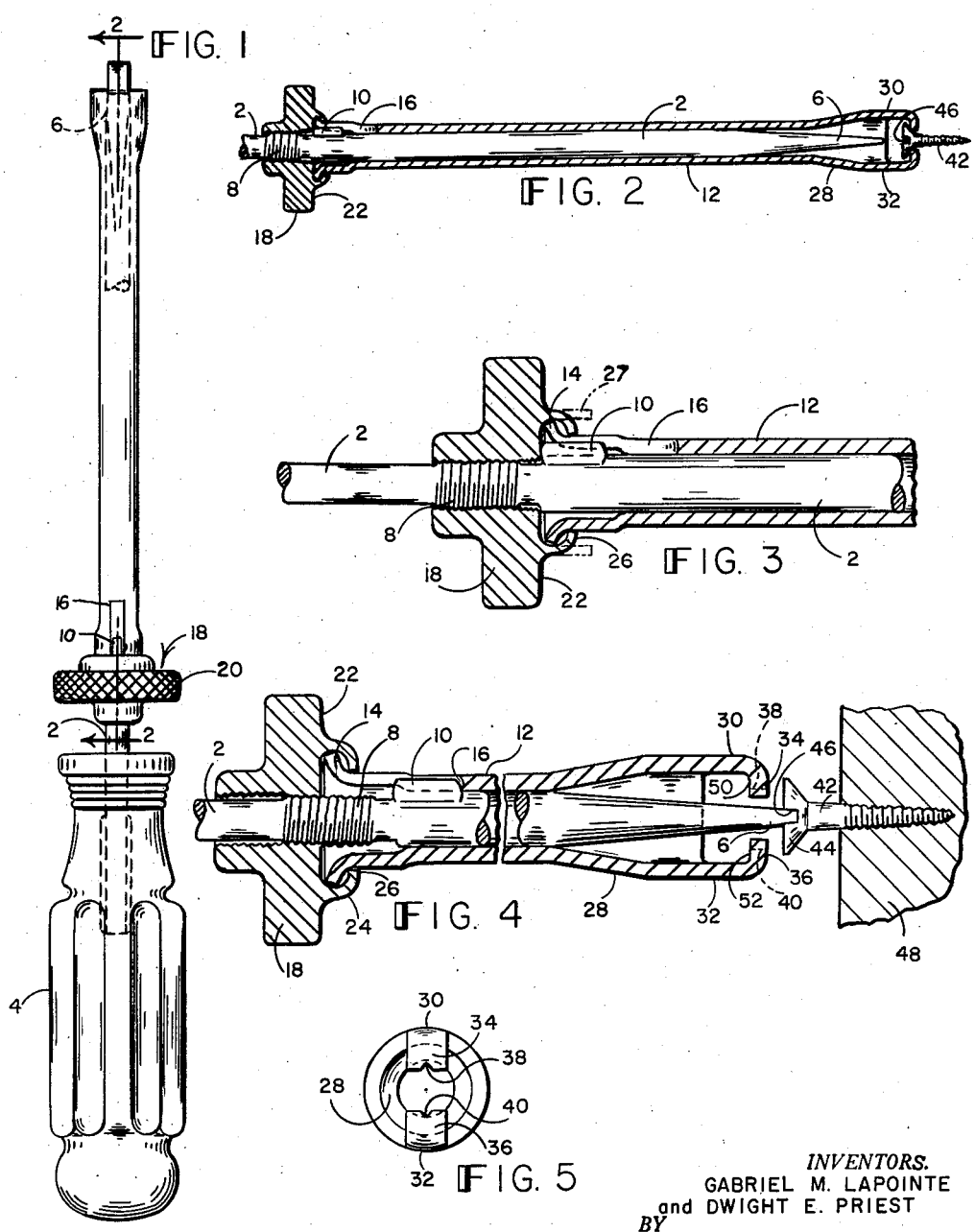

2,902,071

HOLDING SCREW DRIVER

Gabriel M. La Pointe, Worcester, and Dwight E. Priest, Southboro, Mass.

Application January 12, 1956, Serial No. 558,643

2 Claims. (Cl. 145—52)

This invention relates to screw drivers and more particularly to screw drivers of the type provided with means for detachably holding the screw in fixed relation to the screw driver bit as the screw is being driven into wood or other material.

The primary object of this invention is to provide a novel, improved and efficient screw driver construction provided with means whereby a screw may be detachably secured to the screw driver to facilitate driving the screw.

A more specific object of this invention is to provide a screw driver having a cylindrical sleeve in coaxial relation with the shank of the screw driver, said sleeve having a pair of inwardly extending grip lugs or jaws at its front end for gripping the head of a screw and maintaining it in tight engagement with the bit of the screw driver, and means connecting said sleeve and shank for controllably moving said sleeve to and fro in an axial direction whereby to move said lugs relative to said screw driver bit.

Other objects and many of the attendant advantages of this invention will be readily appreciated as the same becomes better understood by reference to the following detailed description when considered in connection with the accompanying drawings, wherein:

Fig. 1 is a view in elevation of a screw driver constructed according to the present invention.

Fig. 2 is a longitudinal section taken along lines 2—2 of Fig. 1.

Fig. 3 is an enlarged sectional view similar to Fig. 2 showing the rear end of the screw driver shank.

Fig. 4 is an enlarged sectional view showing the rear and front ends of the screw driver shank and the sleeve mounted in coaxial relation with the shank.

Fig. 5 is an end view of the sleeve showing details of the screw holding lugs.

Referring now to Figs. 1–4, our new and improved screw driver comprises a solid shank 2 attached at its rear end to a conventional handle 4 and provided at its forward end with a bit or bevelled point 6 for insertion into the kerf or groove of a screw. The shank 2 is provided with thread 8 at a point adjacent the forward end of the handle. Preferably these threads are left hand threads. The shank 2 is also provided with a key or wing 10 which is cold forged.

Surrounding the shank in coaxial relation therewith is a tubular sleeve 12 whose rear end is flared to provide a peripheral flange 14. Sleeve 12 is also provided with a narrow slot 16 which commences at the rear end of the sleeve in flange 14 and extends forwardly for a distance greater than the length of key 10.

Mounted on shank 2 in screw engagement with threads 8 is a nut 18 whose exterior surface is knurled as at 20. The front face 22 of nut 18 has a cylindrical extension 24. This extension is bent inwardly at its front end to form a flange 26. Figure 3 illustrates by dotted lines indicated by numeral 27 the original form or shape of extension 24. This extension is bent over during assembling of the shank and sleeve so as to form flange 26. Flange 14 is locked by flange 26 against the front face 22 of nut 18. In practice, there may be a little play between the sleeve and nut. However, while such play may be tolerated, it can be avoided by carefully designing the length of extension 24 and in bending the extension to form flange 26.

The forward end of sleeve 12 is flared as at 28. The flared or bell shaped end 28 of sleeve 12 is provided with two diametrically opposed fingers 30 and 32 extending parallel to sleeve 12. Fingers 30 and 32 are provided with inwardly extending lugs or jaws 34 and 36 respectively. Lugs 34 and 36 are provided with V-shaped notches 38 and 40 respectively as shown in Fig. 5.

By turning nut 18 it is possible to shift sleeve 12 to and fro relative to shank 2 of the screw driver. Thus, the lugs or jaws 34 and 36 may be moved relative to the bit 6 of the screw driver. In practice, the threads 8 and the length of slot 16 are such as to permit the lugs 34 and 36 to be moved from the position shown in Fig. 4 behind the end of bit 6 to the position shown in Fig. 2 in front of the end of bit 6. The key 10 limits the rearward movement of sleeve 12 by virtue of the engagement that it makes with the sleeve at the front end of slot 16. The key also limits movement of sleeve 12 in a forward direction by virtue of the engagement which is made by the key with nut 18 as shown in Figs. 2 and 3.

The use of the tool will be explained by reference to screw 42.

Assuming that it is desired to drive screw 42 into the surface 48 by means of the screw driver constructed according to the present invention, the operator first rotates nut 18 until the jaws 34 and 36 are positioned in advance of the end of bit 6, as for example, in Fig. 2. The head 44 of the screw is then inserted behind the fingers and held in place there while the nut is rotated in the opposite direction. Rotation of the nut in the opposite direction retracts jaws 34 and 36 so that the end or bit 6 of the screw driver is brought up into engagement with the screw. The screw is maintained so that the bit will enter the kerf 46 in screw head 44 of the screw. Continued rotation of the nut in the same direction forces the jaws and bit close together so that the bit forces the screw head 44 up against the inside faces 50 and 52 of the jaws. The V-shaped notches 38 and 40 cooperate to hold the screw in straight line position and to prevent it from wobbling. With the nut tightened so that the screw will be held locked against the jaws by the bit, it is then a simple matter to drive the screw into the wood or other material. The operator simply rotates handle 4 while exerting a driving force on the screw driver and this acts to drive the screw into the wood or other material. When the screw has been driven in to a sufficient depth, the operator easily releases the screw driver, first by rotating nut 18 in a direction so as to move the bit 6 and the jaws 34 and 36 away from each other into the position illustrated in Fig. 2, and then by moving the screw driver laterally free of the screw head. If now, the sleeve and screw driver shank are moved toward each other until the bit 6 again extends between and beyond jaws 34 and 36, the screw driver may be used to complete driving of the screw to the desired depth.

It is believed apparent that the illustrated construction is simple, durable, and capable of providing a firm locking action on a screw so as to facilitate driving the screw into wood or other material. The jaws of the sleeve are substantially inflexible so that when the bit is moved into engagement with a screw positioned between the jaws, as in Fig. 2, the jaws will not spread, but will, instead, provide inflexible holding action on the screw head in cooperation with the bit of the screw driver itself.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practised otherwise than as specifically described or illustrated.

We claim:

1. A screw driver comprising an elongated rod having a handle at one end and a flat screw driver bit at the opposite end, a lug projecting radially from said rod intermediate its ends, a hollow sleeve surrounding said rod having a pair of fixed inwardly projecting jaws at one end, said jaws being spaced laterally from each other whereby to provide an end opening to receive the shank of a screw, said jaws both being spaced axially from the said one end of said sleeve to provide a side opening to receive the head of a screw, said sleeve having an axial slot in which said lug is positioned, said lug acting to prevent said sleeve from rotating relative to said rod, threads provided on said rod intermediate said lug and said handle, a nut surrounding said rod having threads in mating relation with the threads on said rod, a flange on one face of said nut, and a peripheral flange on said sleeve rotatably secured to the flange on said nut, said sleeve being movable upon rotation of said nut from a first position wherein said jaws are in advance of the tip of said bit to a second position wherein said jaws are in retracted position behind the tip of said bit.

2. A screw driver comprising an elongated rod having a handle at one end and a flat screw driver bit at the opposite end, a hollow sleeve surrounding said rod having a pair of fixed inwardly projecting jaws at one end, said jaws being spaced laterally from each other whereby to provide an end opening to receive the shank of a screw, said jaws both being spaced axially from the said one end of said sleeve to provide a side opening to receive the head of a screw, means preventing relative rotation of said elongated rod and said sleeve, threads provided on said rod intermediate said handle and said screw driver bit, a nut surrounding said rod having threads in mating relation with the threads on said rod, a flange on one face of said nut, and a peripheral flange on said sleeve rotatably secured to the flange on said nut, said sleeve being movable upon rotation of said nut between a first position wherein said jaws are in advance of the tip of said bit and a second position wherein said jaws are in retracted position behind the tip of said bit.

References Cited in the file of this patent

UNITED STATES PATENTS

| 1,448,324 | Wright | Mar. 13, 1923 |
| 1,465,139 | Long | Aug. 14, 1923 |
| 2,576,742 | Wolny | Nov. 27, 1951 |
| 2,696,855 | Seegers | Dec. 14, 1954 |

FOREIGN PATENTS

| 28,448 of 1913 | Great Britain | Aug. 13, 1914 |
| 580,571 | Great Britain | Sept. 12, 1946 |
| 874,128 | Germany | Nov. 8, 1954 |
| 1,072,672 | France | Mar. 17, 1954 |